(12) United States Patent
Yi et al.

(10) Patent No.: US 10,171,267 B2
(45) Date of Patent: Jan. 1, 2019

(54) UPLINK PILOT SEQUENCE ALLOCATION METHOD IN MASSIVE MIMO SYSTEM AND BASE STATION THEREOF

(71) Applicant: SHANGHAI RESEARCH CENTER FOR WIRELESS COMMUNICATIONS, Shanghai (CN)

(72) Inventors: Huiyue Yi, Shanghai (CN); Jing Xu, Shanghai (CN); Yang Yang, Shanghai (CN); Honglin Hu, Shanghai (CN)

(73) Assignee: SHANGHAI RESEARCH CENTER FOR WIRELESS COMMUNICATIONS, Shanghai (CN)

( * ) Notice: Subject to any disclaimer, the term of this patent is extended or adjusted under 35 U.S.C. 154(b) by 52 days.

(21) Appl. No.: 15/376,686

(22) Filed: Dec. 13, 2016

(65) Prior Publication Data

US 2017/0195140 A1 Jul. 6, 2017

(30) Foreign Application Priority Data

Dec. 30, 2015 (CN) .......................... 2015 1 1026667

(51) Int. Cl.
| | |
|---|---|
| *H04W 4/00* | (2018.01) |
| *H04L 25/02* | (2006.01) |
| *H04B 17/318* | (2015.01) |
| *H04B 7/0413* | (2017.01) |
| *H04L 5/00* | (2006.01) |

(52) U.S. Cl.
CPC ....... *H04L 25/0248* (2013.01); *H04B 7/0413* (2013.01); *H04B 17/318* (2015.01); *H04L 5/0048* (2013.01); *H04L 5/0073* (2013.01)

(58) Field of Classification Search
None
See application file for complete search history.

(56) References Cited

U.S. PATENT DOCUMENTS

| | | | |
|---|---|---|---|
| 9,401,824 B1* | 7/2016 | Zhang ................. | H04L 25/0226 370/329 |
| 2006/0018402 A1* | 1/2006 | Mehta ................. | H04B 7/0417 375/299 |
| 2010/0046402 A1* | 2/2010 | Forck ................... | H04L 1/0029 370/280 |
| 2011/0287798 A1* | 11/2011 | Ono ....................... | H04B 7/024 455/509 |
| 2013/0201896 A1* | 8/2013 | Ono ....................... | H04B 7/024 370/312 |

(Continued)

*Primary Examiner* — Anh Vu H Ly
(74) *Attorney, Agent, or Firm* — Soroker Agmon Nordman

(57) ABSTRACT

An uplink pilot sequence allocation method in a massive MIMO system is disclosed, the system including the master base station in the master cell and a neighboring base station in a neighboring cell, including: the neighboring base station comparing a primary eigen-space between a user group of the neighboring cell and the neighboring base station, with an interference eigen-space between a user group of the master cell close to the neighboring base station and the neighboring base station, and determining whether the user group of the neighboring cell can reuse uplink pilot sequence resources used by the user group of the master cell. In a manner of increasing information exchange, intercell cooperative uplink pilot sequence allocation is achieved, and uplink pilot contamination in a multi-cell massive MIMO system is reduced effectively.

10 Claims, 3 Drawing Sheets

(56) References Cited

U.S. PATENT DOCUMENTS

2014/0111372 A1* 4/2014 Wu .................. G01S 7/418
  342/146
2014/0376464 A1* 12/2014 Nam .................. H04B 7/0639
  370/329

* cited by examiner

UPLINK PILOT SEQUENCE ALLOCATION METHOD IN MASSIVE MIMO SYSTEM AND BASE STATION THEREOF

BACKGROUND

Technical Field

The present invention relates to an uplink pilot sequence allocation, particularly to a user-eigen-space-based intercell cooperative uplink pilot sequence allocation method in a massive MIMO system, and also to a base station using the method, which belong to the field of wireless communication technologies.

Related Art

As shown in FIG. 1, in the existing multi-cell massive MU-MIMO system, suppose that there are L cells each having one N-antenna base station (BS) and K single-antenna users. Suppose that all L cells use identical K pilot sequences, which are represented with a τ×K-dimensional orthogonal matrix Φ, satisfying $\Phi^H\Phi=\tau I$. Moreover, suppose that pilot transmission of different cells is synchronous, a channel matrix is:

$$\hat{H}_{i,i} = \frac{1}{\sqrt{\rho_p}\tau} Y_i^p \Phi^* = H_{i,i} + \sum_{l \neq i} H_{i,l} + \frac{1}{\sqrt{v_p\tau}} N_i^p \Phi^*$$

$\Phi^H\Phi=\tau I$ is used in the derivation of the above formula. Kth-column $\hat{h}_{i,k,i}$ of $\hat{H}_{i,i}$ is an estimate value of a channel vector $h_{i,k,i}$. It is thus clear that $\hat{h}_{i,k,i}$ is a linear combination of user channel vectors $h_{i,k,l}$ (l=1, . . . , L) using identical pilot sequences in different cells, and such a phenomenon is referred to as pilot contamination. As the pilot contamination leads to a channel estimation error, not only is detection performance of uplink signals reduced, but also undesired users are interfered a lot if downlink precoding is performed by using the channel matrix.

FIG. 2 gives a schematic diagram of uplink pilot contamination in a massive MIMO system. With respect to a base station 1, if User 1 in Cell 1 and User 2 in Cell 2 use an identical uplink pilot sequence, as the base station 1 cannot separate signals (having the same eigen-space) of the two users, a pilot contamination problem is produced. On the other hand, if User 1 in Cell 1 and User 4 in Cell 2 use an identical uplink pilot sequence, the base station is easy to separate signals (having different eigen-spaces) of the two users by eigen-space separation. At this point, a pilot contamination problem may not be produced. It is thus clear that pilot contamination is produced between adjacent edge users of a neighboring cell, and thus it is necessary to allocate different pilot sequences to the users. On the other hand, for users in the center of the cell, it is easy to solve the pilot contamination problem thereof (e.g., by eigen-space separation), and thus identical pilot sequences can be allocated to the users.

As pilot contamination is produced between adjacent edge users of a neighboring cell as the users have identical eigen-spaces such that the base station cannot separate uplink signals of different users. Therefore, it is only necessary to consider how to eliminate pilot contamination between cell edge users.

With respect to the uplink pilot contamination in the massive MIMO system, some solutions of suppressing pilot contamination have been put forward. Several typical solutions are introduced below, and their deficiencies are described at the same time.

(1) Protocol Based Pilot Contamination Suppression Method

The most direct method is to reduce a pilot contamination effect by frequency multiplexing or reducing users using non-orthogonal pilot sequences. However, generally, the frequency multiplexing cannot make use of the advantage that the massive MIMO system can multiplex a great number of users at the same time, this is because the number of users served decreases although the method improves SINR of particular users.

The existing time-shift (nonsynchronous)-transmission-protocol based solution has a basic idea of dividing a cell into several groups $A_1, \ldots, A_\Gamma$, and using a time-shift transmission protocol in the groups, which is described in FIG. 3 by giving an example of $\Gamma=3$. When users in the group $A_1$ transmits a pilot, a base station (BS) in the group $A_2$ sends downlink data signals. This avoids pilot contamination between users in the group $A_1$ and the group $A_2$. Meanwhile, a base station in the group $A_1$ needs to estimate a channel matrix of the users in the group $A_1$ when downlink sending signals from base stations in which the group $A_2$ and the group $A_3$ are present. Since the downlink transmitting power $\rho_d$ is generally greater than the power $\rho_P$ of a pilot sequence, it is not clear at present how much gain the method can provide.

(2) Angle of Arrival (ADA) Based Pilot Contamination Suppression Method

Studies show that, in an actual channel model, interference may not exist between some users having identical or non-orthogonal pilot sequences. According to a multi-path channel model about a uniform linear array (ULA), an array steering vector may be expressed as:

$$a(\theta) = \begin{bmatrix} 1 \\ e^{-j2\pi\frac{D}{\lambda}\cos(\theta)} \\ \vdots \\ e^{-j2\pi\frac{(N-1)D}{\lambda}\cos(\theta)} \end{bmatrix}$$

In the above formula, D is an antenna distance, λ is a carrier wavelength, and θ is a random AOA of f(θ) having a probability density function (PDF). It is well documented that, even if users use identical pilot sequences, it is difficult for their pilots to interfere with each other as long as they have non-overlapping AOA PDFs. Therefore, a solution of reducing pilot contamination is proposed in some documents that identical pilot sequences are allocated to the users having non-overlapping AOA PDFs. However, the method requires a related matrixes between respective users of respective base stations to satisfy a condition that their primary eigen-spaces do not overlap and requires the base stations to know covariance matrixes between them and all the users. That is to say, if there are L base stations and K users in each base station, it is required that the base stations could obtain LK covariance matrixes between them and the LK users. However, in fact, it is difficult for the base stations to acquire information of the LK covariance matrixes. In addition, when two users in different cells to a certain base station have similar AOAs, the base station cannot distinguish the two users.

(3) Eigen-Space Division Based Blind Pilot Contamination Suppression Method

An eigenvalue decomposition (EVD) channel estimation and iterative projection least squares based channel vector estimation method is proposed in some documents. Such a eigen-space division technology based and EVD based channel estimation method requires that channel vectors of different users should be orthogonal, and this assumption enables the base station to estimate channel vectors by receiving the amount of statistics of data.

However, if two users using identical pilot sequences in adjacent two cells are both located at edges and very close to each other, the two users may be in the same eigen-space, and it is difficult to separate the two users' eigen-space with the EVD method. At this point, the EVD based blind suppression method cannot reduce the pilot contamination effectively.

SUMMARY

A primary technical problem to be solved in the present invention is to provide an uplink pilot sequence allocation method in a massive MIMO system.

Another technical problem to be solved in the present invention is to provide a neighboring base station using the uplink pilot sequence allocation method in a massive MIMO system.

To achieve the foregoing invention objectives, the present invention adopts the following technical solutions:

According to a first aspect of embodiments of the present invention, an uplink pilot sequence allocation method in a massive MIMO system is provided, the system including the master base station in the master cell and a neighboring base station in a neighboring cell, including:

the neighboring base station comparing a primary eigen-space between a user group of the neighboring cell and the neighboring base station with an interference eigen-space between a user group of the master cell close to the neighboring base station and the neighboring base station, and determining whether the user group of the neighboring cell can reuse uplink pilot sequence resources used by the user group of the master cell.

Preferably, the neighboring base station obtains information of the interference eigen-space and information of the uplink pilot sequence used by the user group of the master cell through exchange with the master base station.

Preferably, reference signal strength between the user group of the master cell and the neighboring base station is greater than a predetermined threshold.

Preferably, primary eigen-space between the user group of the master cell and the master base station have similarity.

Preferably, the primary eigen-space between the user group of the neighboring cell and the neighboring base station does not overlap with the interference eigen-space between the user group of the master cell close to the neighboring base station and the neighboring base station.

Preferably, the neighboring base station reuses the uplink pilot sequence for the user group of the neighboring cell and the user group of the master cell.

Preferably, the primary eigen-space between the user group of the neighboring cell and the neighboring base station overlaps with the interference eigen-space between the user group of the master cell close to the neighboring base station and the neighboring base station.

Preferably, when the neighboring base station determines whether uplink pilot sequence resources used by the user group of the master cell can be reused, if adjustment can be made in the neighboring cell, the neighboring base station notifies the master base station that the uplink pilot contamination is eliminated, and exchanges pilot usage information of an edge user group of the neighboring cell to the master base station.

Preferably, when the neighboring base station determines whether uplink pilot sequence resources used by the user group of the master cell can be reused, if the neighboring cell cannot be adjusted, the neighboring base station needs to negotiate with the master base station for settlement.

Preferably, the method further includes:

respective users of the master cell measuring a primary eigen-space between them and the master base station and reference signal strength between them and the neighboring base station;

the master base station grouping the users of the master cell, finding a user group close to the neighboring cell, and determining an interference eigen-space between the user group and the neighboring base station; and the master base station exchanging the interference eigen-space and the uplink pilot sequence used by the user group to the neighboring base station.

According to a second aspect of the embodiments of the present invention, a neighboring base station using an uplink pilot sequence allocation method in a massive MIMO system is provided, the system including the master base station in the master cell and a neighboring base station in a neighboring cell, wherein the neighboring base station compares a primary eigen-space between a user group of the neighboring cell and the neighboring base station with an interference eigen-space between a user group of the master cell close to the neighboring base station and the neighboring base station, and determines whether the user group of the neighboring cell can reuse uplink pilot sequence resources used by the user group of the master cell.

The present invention, by comparing a primary eigen-space between a user group of the neighboring cell and the neighboring base station with an interference eigen-space between a user group of the master cell and the neighboring base station, judges whether the user group of the neighboring cell can reuse an uplink pilot sequence of the user group of the master cell, so as to achieve avoiding reuse of the uplink pilot sequence only for user groups at cell edges, thereby avoiding pilot contamination. By use of the present invention, the user group in the center of the cell can reuse uplink pilot sequence resources to the greatest extent, thus improving the resource utilization.

DETAILED DESCRIPTION

The technical contents of the present invention are further described below in detail with reference to the accompanying drawings and specific embodiments.

With respect to the uplink pilot sequence allocation in a massive MIMO system, the present invention proposes an intercell cooperative uplink pilot allocation method based on pilot sequence use information in an eigen-space (a feature space), so as to suppress uplink pilot contamination.

S1: A master base station of a master cell groups users according to a user eigen-space similarity, determines a user group nearest a neighboring cell, and determines an interference eigen-space between the user group and a base station of the neighboring cell.

S2: The master base station of the master cell exchanges interactive information (including the interference eigen-space between the user group of the master cell and the base station of the neighboring cell, and uplink pilot use information of the user group) to the base station of the neighboring cell.

S3: The base station of the neighboring cell, according to the interactive information, determines whether the user group nearest in the neighboring cell can use identical uplink pilot sequences with a user group where the interference eigen-space is located.

Specifically, if the primary eigen-space of the user groups in the neighboring cell and the interference eigen-space have high similarity, users in the two user groups (the user group of the master cell and the user group of the neighboring cell) cannot use identical uplink pilot sequences; otherwise, the users in the two user groups can use identical uplink pilot sequences.

In this way, the intercell cooperative uplink pilot sequence allocation method in a massive MIMO system which performs ranking based on user eigen-space groups and relative strength of the reference signal strength can be achieved.

Figure 1:
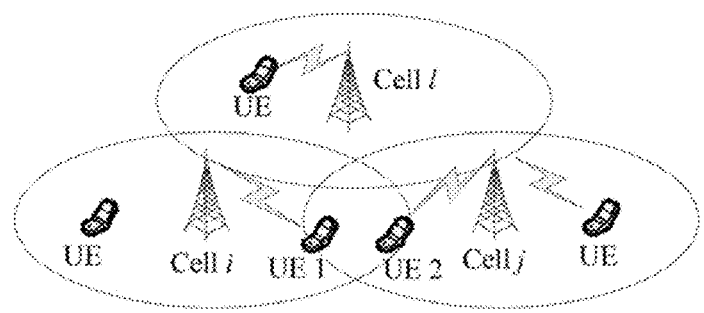
FIG. 1 is a schematic diagram of a cell massive MU-MIMO system.
Figure 2:
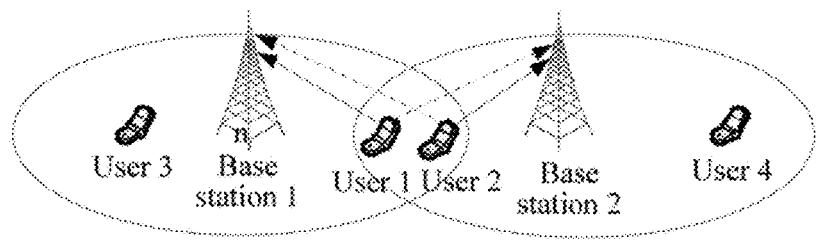
FIG. 2 is a schematic diagram of uplink pilot contamination in a massive MIMO system.
Figure 3:
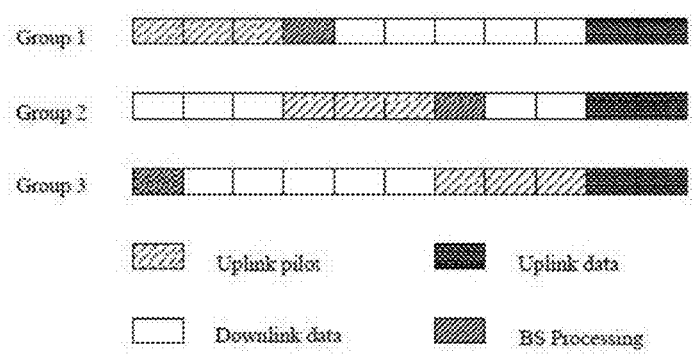
FIG. 3 is a flowchart of the existing time-shift based pilot sequence allocation method.
Figure 4:
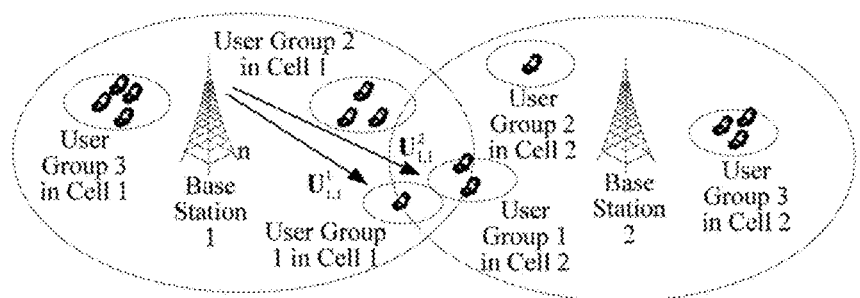
FIG. 4 is a schematic diagram of user groups based on eigen-space similarity in a cell.
Figure 5:
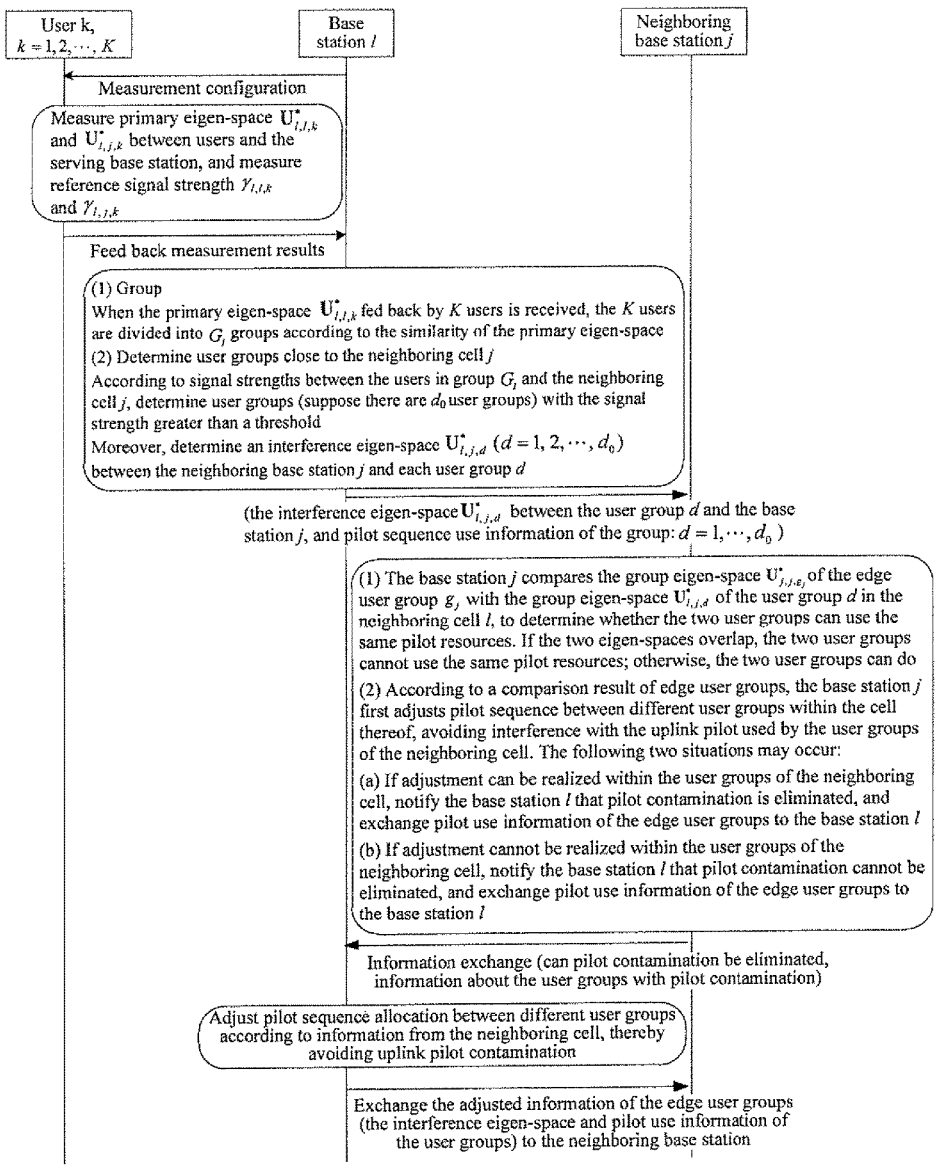
FIG. 5 is a flowchart of an uplink pilot sequence allocation method in a massive MIMO system according to the present invention.

Specific description is provided below with reference to the accompanying drawings. FIG. 4 gives a schematic diagram of user groups based on eigen-space similarity in a multi-cell massive MIMO system; and FIG. 5 gives a signaling flowchart of an intercell cooperative uplink pilot sequence allocation method based on pilot sequence use information exchange in eigen-spaces in a massive MIMO system.

As stated above, as the pilot contamination is produced between adjacent edge users of a neighboring cell, the users have identical eigen-spaces such that the base station cannot separate uplink signals of different users, Therefore, it is only necessary to consider how to eliminate pilot contamination between two cell edge users.

As shown in FIG. 4, uplink pilot contamination may be caused between edge user groups of two adjacent cells. For example, for User Group 1 in Cell 1 and User Group 1 in Cell 2 , if a primary eigen-space $U_{1,1}^{1}$ between User Group 1 in Cell 1 and Base Station 1, and an interference eigen-space $U_{1,1}^{2}$ between User Group 1 in Cell 2 and Base Station 1 are located in the same eigen-space, that is, $\|U_{1,1}^{2}(U_{1,1}^{2})^{H} - U_{1,1}^{1}(U_{1,1}^{1})^{H}\| < \beta$, users in the two groups cannot use identical uplink pilot sequence, and otherwise, a serious uplink pilot contamination problem may be produced. On the contrary, if user groups in two adjacent cells are far away from each other, for example, User Group 1 in Cell 1 and User Group 3 in Cell 2, users in the two user groups can use identical uplink pilot sequences. This is because the two user groups are located in different eigen-spaces, and it is easy to separate uplink signals of the two user groups with an Eigen Value Decomposition (EVD) method. Therefore, it is easy to eliminate uplink pilot contamination of these two user groups.

The present invention focuses on eliminating user uplink pilot contamination between user groups at two cell edges. With respect to a massive MIMO system, the present invention provides an intercell cooperative uplink pilot sequence allocation method based on exchange of pilot use information in eigen-spaces, which, as shown in FIG. 4 and FIG. 5, includes the following steps.

At first, suppose there are K orthogonal uplink pilot sequences $\{a_k\}_{k=1}^{K}$, each cell has K users, and the K users in each cell multiplex the K orthogonal uplink pilot sequences. Moreover, for ease of description, suppose that a massive MIMO system has at least two cells, one is a master cell where a master base station is located, and the other is a neighboring cell where a neighboring base station is located (in the figure, Base Station 1 is the master cell, and Base Station 2 is the neighboring cell), and suppose that a user k in each cell uses a pilot sequence $a_k$(k=1, 2, ..., K).

Step 1: Users of the master cell measure primary eigen-space between them and the master base station, and reference signal strength between them and the neighboring base station.

For the user k (k=1, 2, ... K) in the master base station (the master cell) l (l=1, 2), coherency time of a channel related matrix $R_{l,j,k}$ between the user and the neighboring base station j (j=1, 2) changes slowly relative to that of an instantaneous channel matrix $H_{l,k,k}$, and thus each user can acquire its primary eigen-space $U^{*}_{l,j,k}$ with the neighboring base station by using a eigen-space estimation and tracking algorithm at an downlink training stage, and feeds it back to a base station (BS) at a low frequency. At the same time, the user k in the master cell l (l=1, 2) measures and feeds back reference signal strength $\gamma_{l,j,k}$ between it and the base station j.

Step 2: The master base station of the master cell groups the users, finds user groups close to the neighboring cell, and determines an interference eigen-space between the user groups and the neighboring base station.

When the master base station l receives the primary eigen-space $U^{*}_{l,l,k}$ fed back by the K users (l=1, 2), K users are divided into $G_l$ user groups according to the similarity of the primary eigen-space $U^{*}_{l,l,k}$. The group primary eigen-space of the user group $g_l$ ($1 \leq g_l \leq G_l$) is expressed as $U^{*}_{l,l,g_l}$. Suppose that $K_{l,g}$ indicates the number of users in the user group g of the master cell l, in this way, $K = \sum_{g=1}^{G_l} K_{l,g}$.

Moreover, the master base station l, for $G_l$ user groups in the master cell, selects the maximum reference signal strength (expressed as $\gamma_{l,g_l}^{j}$) or average reference signal strength (expressed as $\bar{\gamma}_{l,g_l}^{j}$) between the user in the user group $g_l$ ($1 \leq g_l \leq G_l$) and the neighboring base station j, and takes $\gamma_{l,g_l}^{j}$ (or $\bar{\gamma}_{l,g_l}^{j}$) as the reference signal strength between the user group $g_l$ in the master cell l and the neighboring base station j.

The master base station l sets a threshold for the reference signal strength, and the master base station l determines user groups (suppose there are $d_0$ user groups) in the master cell, which have reference signal strengths (between the master cell and the neighboring cell j) greater than the threshold. User eigen-spaces are grouped at first, and then user groups are ranked according to the reference signal strength. In this way, the user group ranked ahead, with higher reference signal strength, is closer to the neighboring cell. It should be noted that a user group with the maximum reference signal strength can be selected in another way, to use the reference signal strength of the user group as grouping reference signal strength, for example, an average value of the reference signal strength or other calculation are applied.

Moreover, the master base station l determines an interference eigen-space $U^{*}_{l,j,d}$ (d=1, 2, ..., $d_0$) between the neighboring base station j and each user group d in the $d_0$ user groups, based on the primary eigen-spaces {$U^*_{l,j,k}$, k∈user group d} between the users in each group d and the neighboring base station j.

Step 3: the master base station of the master cell exchanges with the neighboring base station information of the interference eigen-space and pilot sequence use information in the user group.

The master base station l exchanges the following information to the neighboring base station j: ({the interference eigen-space information $U^*_{l,j,d}$ between the user group d in the master cell l and the neighboring base station j, and the uplink pilot sequence use information of the user group d}, d=1, 2, ... , $d_0$). The following information is of $d_0$ user groups (in the master cell) adjacent to the neighboring cell j.

Step 4: The neighboring base station compares the primary eigen-space of the user group of the neighboring cell with the interference eigen-space obtained in step 3, and determines whether the uplink pilot sequence can be reused.

After receiving the information from the base station l, the neighboring base station j, by comparing primary eigen-space $U^*_{j,j,g_j}$ of the user group $g_j$ (adjacent to the master cell l) in the neighboring cell j with the interference eigen-space $U^*_{l,j,d}$ (d=1, 2, ... , $d_0$), determines whether the user group $g_j$ (adjacent to the master cell l) in the neighboring cell j can use pilot sequence that is the same as the pilot sequence of the user group d (d=1, 2, ... , $d_0$) in the master cell l.

If the primary eigen-space and the interference eigen-space has the following relation: $\|U^*_{j,j,g_j}(U^*_{j,j,g_j})^H - U^*_{l,j,d}(U^*_{l,j,d})^H\| > \beta$ (β is preset according to Qos etc.), it's indicated that the primary eigen-spaces $U^*_{j,j,g_j}$ and the interference eigen-space $U^*_{j,l,d}$ of the two user groups do not overlap, so that identical uplink pilot sequence or identical downlink time-frequency resources can be allocated to the users in the two user groups. As the primary eigen-space between the user group of the neighboring cell and the neighboring base station does not overlap with the interference eigen-space between the user group (close to the neighboring base station) of the master cell and the neighboring base station, the neighboring base station allocates the uplink pilot sequence reused with the user group of the master cell, for the user group of the neighboring cell.

If $\|U^*_{j,j,g_j}(U^*_{j,j,g_j})^H - U^*_{l,j,d}(U^*_{l,j,d})^H\| \leq \beta$, it's indicated that the primary eigen-spaces $U^*_{j,j,g_j}$ and the interference eigen-spaces $U^*_{j,l,d}$ of the two user groups overlap, identical uplink pilot sequence or identical downlink time-frequency resources cannot be allocated to the users in the two user groups.

According to a comparison result of edge user groups, the neighboring base station j first adjusts pilot sequence allocation between different user groups within the neighboring cell, avoiding that the same uplink pilot sequences are used by the user groups of the neighboring cell and the user groups of the master cell. The user groups of the neighboring cell and the user groups of the master cell have primary eigen-spaces overlapped. The following two situations may occur:

(a) If adjustment can be realized within the neighboring cell, the neighboring base station j notifies the master base station l that uplink pilot contamination is eliminated and exchanges pilot use information of the edge user groups to the master base station l.

(b) Otherwise, if the adjustment cannot be realized within the neighboring cell, the neighboring base station j negotiates with the master base station l for a settlement. Then, the neighboring base station j notifies the master base station l that uplink pilot contamination cannot be eliminated, and exchanges, to the master base station l, pilot sequence use information of the eigen-spaces which the edge user groups belongs to.

Then, the master base station l performs adjustment within the master cell according to the pilot sequence use information of the eigen-spaces where the edge user groups belongs to. In this way, the master base station l performs adjustment between different user groups in the master cell, avoiding that the same uplink pilot sequences are used by the user groups of the neighboring cell and the user groups of the master cell. The user groups of the neighboring cell and the user groups of the master cell have primary eigen-spaces overlapped. Moreover, the base station l exchanges the adjusted pilot sequence use information of the eigen-spaces which the edge user groups belongs, to the neighboring base station j.

With respect to a massive MIMO system, the present invention, by increasing information exchange between base stations and information exchange between users and base stations, provides an intercell cooperative uplink pilot sequence allocation method based on reference signal use information of the interference eigen-spaces, thus effectively reducing uplink pilot contamination in a multi-cell massive MIMO system.

The present invention further provides a base station performing the uplink pilot sequence allocation in the massive MIMO system, that is, the neighboring base station in the foregoing method. The system includes the master base station in the master cell and the neighboring base station in the neighboring cell.

The neighboring base station obtains information of the interference eigen-space between the user groups (close to the neighboring base station) of the master cell and the neighboring base station, and the information of the uplink pilot sequence used by the user groups of the master cell, by means of exchanging with the master base station.

Then, the neighboring base station compares the primary eigen-space between the user groups of the neighboring cell and the neighboring base station with the interference eigen-space between the user groups (close to the neighboring base station) of the master cell and the neighboring base station, and determines whether the user groups of the neighboring cell can reuse uplink pilot sequence resources used by the user groups of the master cell.

Primary eigen-spaces between the user group of the master cell and the master base station have similarity, to form a user group. The reference signal strength between the user group of the master cell and the neighboring base station is greater than a predetermined threshold, so the users in the user group are edge users of the master cell. The maximum reference signal strength between respective users in the user group of the master cell and the neighboring base station is taken as the reference signal strength between the user group of the master cell and the neighboring base station.

If the primary eigen-space between the user group of the neighboring cell and the neighboring base station does not overlap with the interference eigen-space between the user group (close to the neighboring base station) of the master cell and the neighboring base station, the neighboring base station allocates the uplink pilot sequence reused by the user group of the master cell, for the user group of the neighboring cell.

Finally, the neighboring base station exchanges the uplink pilot sequence of the user group of the neighboring cell to the master base station.

If the primary eigen-space between the user group of the neighboring cell and the neighboring base station overlaps with the interference eigen-space between the user group of the master cell and the neighboring base station, when the neighboring base station determines whether uplink pilot sequence resources used by the user group of the master cell can be reused, the neighboring base station notifies the master base station that the uplink pilot contamination is eliminated and exchanges pilot sequence use information of an edge user group of the neighboring cell to the master base station (if adjustment of the pilot sequence allocation can be realized within the neighboring cell); or the neighboring base station negotiates with the master base station for settlement (if adjustment of the pilot sequence allocation cannot be realized within the neighboring cell).

The above describes the uplink pilot sequence allocation method in a massive MIMO system and a base station thereof provided in the present invention in detail. Any obvious variation made by those of ordinary skill in the art without departing from the essence and the spirit of the present invention will infringe upon the patent right of the present invention, and may bear the corresponding legal responsibility.

What is claimed is:

1. An uplink pilot sequence allocation method in a massive MIMO system, the system comprising a master base station in a master cell and a neighboring base station in a neighboring cell, comprising:
   the neighboring base station comparing a primary eigen-space between a user group of the neighboring cell and the neighboring base station with an interference eigen-space between a user group of the master cell and the neighboring base station, the user group of the master cell being close to the neighboring base station,
   the neighboring base station determining whether the user group of the neighboring cell can reuse uplink pilot sequence resources used by the user group of the master cell.

2. The uplink pilot sequence allocation method in a massive MIMO system according to claim 1, wherein
   the neighboring base station, by exchanging with the master base station, obtains information of the interference eigen-space and information of the uplink pilot sequence used by the user group of the master cell.

3. The uplink pilot sequence allocation method in a massive MIMO system according to claim 2, wherein
   reference signal strength between the user group of the master cell and the neighboring base station is greater than a predetermined threshold.

4. The uplink pilot sequence allocation method in a massive MIMO system according to claim 3, wherein
   the reference signal strength between the user group of the master cell and the neighboring base station is a maximum of reference signal strength between respective users in the user group of the master cell and the neighboring base station.

5. The uplink pilot sequence allocation method in a massive MIMO system according to claim 3, wherein
   primary eigen-spaces between the user group of the master cell and the master base station have similarity.

6. The uplink pilot sequence allocation method in a massive MIMO system according to claim 5, wherein
   the primary eigen-space between the user group of the neighboring cell and the neighboring base station does not overlap with the interference engen-space between the user group of the master cell and the neighboring base station.

7. The uplink pilot sequence allocation method in a massive MIMO system according to claim 5, wherein
   the primary eigen-space between the user group of the neighboring cell and the neighboring base station overlaps with the interference eigen-space between the user group of the master cell and the neighboring base station.

8. The uplink pilot sequence allocation method in a massive MIMO system according to claim 7, wherein
   when the neighboring base station determines whether uplink pilot sequence resources used by the user group of the master cell can be reused,
   if adjustment of pilot sequence allocation can be realized within the neighboring cell, the neighboring base station exchanges pilot use information of an edge user group of the neighboring cell to the master base station.

9. The uplink pilot sequence allocation method in a massive MIMO system according to claim 7, wherein
   when the neighboring base station determines whether uplink pilot sequence resources used by the user group of the master cell can be reused, the neighboring base station negotiates with the master base station for settlement if the neighboring cell cannot adjust pilot sequence allocation within the neighboring cell.

10. The uplink pilot sequence allocation method in a massive MIMO system according to claim 1, further comprising:
    users of the master cell individually measuring a primary eigen-space between them and the master base station and reference signal strength between them and the neighboring base station;
    the master base station grouping the users of the master cell, finding a user group close to the neighboring cell, and determining an interference eigen-space between the user group close the neighboring cell and the neighboring base station; and
    the master base station exchanging the interference eigen-space and the uplink pilot sequence used by the user group to the neighboring base station.

* * * * *